(12) United States Patent
Lee et al.

(10) Patent No.: US 8,170,147 B2
(45) Date of Patent: May 1, 2012

(54) APPARATUS FOR CANCELLING DC OFFSET AND METHOD THEREOF

(75) Inventors: Yong-Su Lee, Daejeon (KR); Youn-Ok Park, Daejeon (KR); Eon-Young Hong, Daejeon (KR)

(73) Assignees: Samsung Electronics Co., Ltd., Suwon-si (KR); Electronics and Telecommunications Research Institute, Daejeon (KR); KT Corporation, Seongnam-si (KR); SK Telecom Co., Ltd., Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 1297 days.

(21) Appl. No.: 11/721,139

(22) PCT Filed: Sep. 6, 2005

(86) PCT No.: PCT/KR2005/002943
§ 371 (c)(1),
(2), (4) Date: Jun. 7, 2007

(87) PCT Pub. No.: WO2006/062284
PCT Pub. Date: Jun. 15, 2006

(65) Prior Publication Data
US 2010/0128819 A1 May 27, 2010

(30) Foreign Application Priority Data

Dec. 11, 2004 (KR) .......................... 10-2004-0104605
Feb. 22, 2005 (KR) .......................... 10-2005-0014527

(51) Int. Cl.
*H04L 25/06* (2006.01)
(52) U.S. Cl. ....................................................... 375/319
(58) Field of Classification Search .................. 375/319, 375/346; 455/324, 344
See application file for complete search history.

(56) References Cited

U.S. PATENT DOCUMENTS

| 6,204,783 | B1 * | 3/2001 | Paz et al. ......................... 341/118 |
| 6,292,122 | B1 * | 9/2001 | Younis et al. .................... 341/143 |
| 6,639,909 | B1 * | 10/2003 | Sakuma ......................... 370/350 |
| 6,717,995 | B2 | 4/2004 | Zvonar |
| 2003/0199264 | A1 * | 10/2003 | Holenstein et al. ........... 455/324 |
| 2004/0202102 | A1 | 10/2004 | Kim |
| 2004/0240594 | A1 * | 12/2004 | Rudberg ........................ 375/346 |
| 2005/0260962 | A1 * | 11/2005 | Nazrul et al. ............... 455/226.1 |

FOREIGN PATENT DOCUMENTS

| KR | 1020020080585 A | 10/2002 |
| KR | 1020040088627 A | 10/2004 |
| KR | 102005060632 A | 6/2005 |

* cited by examiner

*Primary Examiner* — David C. Payne
*Assistant Examiner* — Leon-Viet Nguyen
(74) *Attorney, Agent, or Firm* — Jefferson IP Law, LLP

(57) ABSTRACT

An apparatus and method for canceling a DC offset efficiently removes the DC offset by calculating the DC offset after acquiring synchronization in a terminal receiver used for an orthogonal frequency division multiplexing system. The apparatus for canceling the DC offset includes an adding/averaging unit (130), an accumulator (140), a synchronization determiner (150), and a pulse density modulation signal generator (160). The adding and averaging the added input data signals over one frame. The accumulator (140) outputs a DC offset control value by successively accumulating the DX offsets calculated from the adding and averaging unit. The synchronization determiner (150) determines whether to output the DC offset control value provided by the accumulator (140) based on synchronization information. The pulse density modulation signal generator (160) generates a digital pulse density modulation signal based on a representative value provided by the synchronization determiner (150).

11 Claims, 3 Drawing Sheets

APPARATUS FOR CANCELLING DC OFFSET AND METHOD THEREOF

TECHNICAL FIELD

The present invention relates to a terminal receiver for an OFDM (orthogonal frequency division multiplexing) system. More specifically, the present invention relates to an apparatus for canceling a DC offset of a terminal receiver.

BACKGROUND ART

Generally, the OFDM scheme has attracted considerable attention in the wireless communication system field since it is appropriate for multi-path fading channels, and has high bandwidth efficiency. In the OFDM wireless communication system, a receiver functions to receive signals through an antenna, to demodulate the signals through an RF port and an IF port, and to recover the signals. In detail, in order to obtain desired signals, the RF port and the IF port receive the signals from the antenna, and then perform a frequency down-converting function and a signal-amplifying function for the signals. For this, the RF unit and the IF unit uses various analog elements including a mixer and an amplifier. The elements satisfy predetermined standards to a certain degree, but the elements are incompletely insulated from each other and have insignificant quadrature. Thus, there is a problem that the input signals are distorted. Particularly, the input signals are distorted by a DC offset. The DC offset is generated at the received original signal when drift signals are self-mixing in a quadrature converter. The drift signals are so-called abnormal signals occurring from an analogue circuit of an OFDM wireless communication system. In detail, the DC offset is generated at the received original signal when the RF port receives the mixed signals, which are the abnormal drift signals mixed at baseband, and an analogue-to-digital converter (ADC) converts the mixed signals into digital signals.

Recently, the direct-conversion method has been developed to produce a receiver at a low price. In the direct-conversion method, the received radio-frequency (RF) is down-converted directly to a baseband frequency without going through any intermediate frequency (IF).

By using the direct-conversion method, a receiver can directly convert the received RF signal to baseband so that many intermediate filters, mixers, and amplifiers may be omitted or simplified.

However, the direct conversion receiver has a problem of generating a large DC offset, since the direct-conversion receiver utilizes a local oscillator and the frequency of the local oscillator is approximately the same as the frequency of the received RF signal. Thus, the direct conversion receiver is keenly desired to remove a DC offset.

The above information disclosed in this Background section is only for enhancement of understanding of the background of the invention and therefore, it may contain information that does not form the prior art that is already known in this country to a person or ordinary skill in the art.

DISCLOSURE OF INVENTION

Technical Problem

The present invention has been made in an effort to provide an apparatus for canceling a DC offset having advantages of efficiently removing a DC offset by calculating a DC offset after acquiring synchronization in a terminal receiver used for an orthogonal frequency division multiplexing system.

Technical Solution

An exemplary apparatus for canceling a DC offset in a terminal receiver of an orthogonal frequency division multiplexing system includes an adding and averaging unit for calculating a DC offset of an input signal by adding the input data signals and averaging the added input data signals over one frame, an accumulator for outputting a DC offset control value by successively accumulating the DC offsets calculated from the adding and averaging unit, a synchronization determiner for determining whether to output the DC offset control value provided by the accumulator based on synchronization information, and a pulse density modulation signal generator for generating a digital pulse density modulation signal based on a representative value provided by the synchronization determiner.

The synchronization determiner may include a second adder for adding a predetermined reference value to the DC offset control value output and a comparator for outputting either of the reference value and an output value of the second adder based on the synchronization value when the reference value and the output value are input.

In a further embodiment, a method for canceling a DC offset in a terminal receiver of an orthogonal frequency division multiplexing system includes determining whether to acquire a synchronization, calculating a DC offset control value for an input signal based on sample data values of a predetermined block of the input signal when the synchronization is acquired, outputting a pulse density modulation signal based on the DC offset control value pulse, and shifting the analogue pulse density modulation signal so as to have a predetermined level and transmitting the shifted analogue pulse density modulation signal to a following input signal.

The DC offset control value may be calculated by using a truncation bit to minimize a bit error rate of the orthogonal frequency division multiplexing system. The predetermined block may be a preamble block applied directly after the synchronization pulse is provided.

BEST MODE FOR CARRYING OUT THE INVENTION

Figure 1:
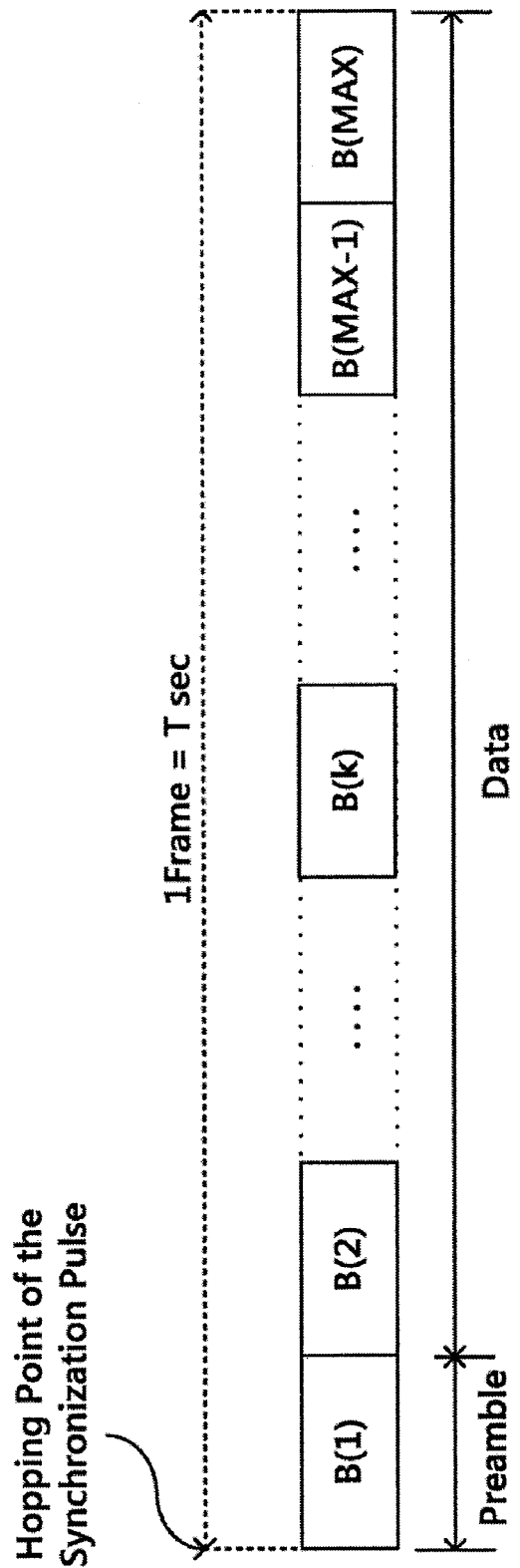
FIG. 1 is a diagram showing an entire data frame structure of data signal input into an apparatus for canceling a DC offset according to an exemplary embodiment of the present invention.

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Firstly, an apparatus for canceling a DC offset according to an exemplary embodiment of the present invention will be described in detail with reference to FIG. 1 to FIG. 3.

Generally, a frame is data that is transmitted in the OFDM communication system as a complete unit of a data channel with addressing information and necessary protocol control information. The frame is usually transmitted in series bit by bit and contains a preamble and a plurality of data. The data values are determined by inverse fast Fourier transform (IFFT) to have a different energy level while the preamble value is normalized to have a constant energy level. Accordingly, the preamble can be utilized to estimate frequency or data channel as to remove a frequency offset or a DC offset.

FIG. 1 is a diagram showing a structure of a data frame according to an exemplary embodiment of the present invention.

As shown in FIG. 1, one frame has a period "T" seconds and MAX-numbered block samples. Among block samples B(k) of the one frame (herein, k is a natural number selected within the range 1 to MAX), a first block sample B(1) becomes a preamble and following block samples B(2) to B(MAX) become data from when a synchronization pulse is hopping. That is, a hopping timing of the synchronization pulse determines a preamble. As such, when the synchronization is acquired, a DC offset can be estimated and removed by utilizing the preamble of the frame. But, when the synchronization is not acquired, any preamble cannot be detected. Accordingly, an alternative method for removing a DC offset should be provided. In summary, an apparatus for canceling a DC offset according to an exemplary embodiment of the present invention firstly determines whether the synchronization is acquired and performs a process for canceling a DC offset only in a synchronization acquisition state.

Figure 2:
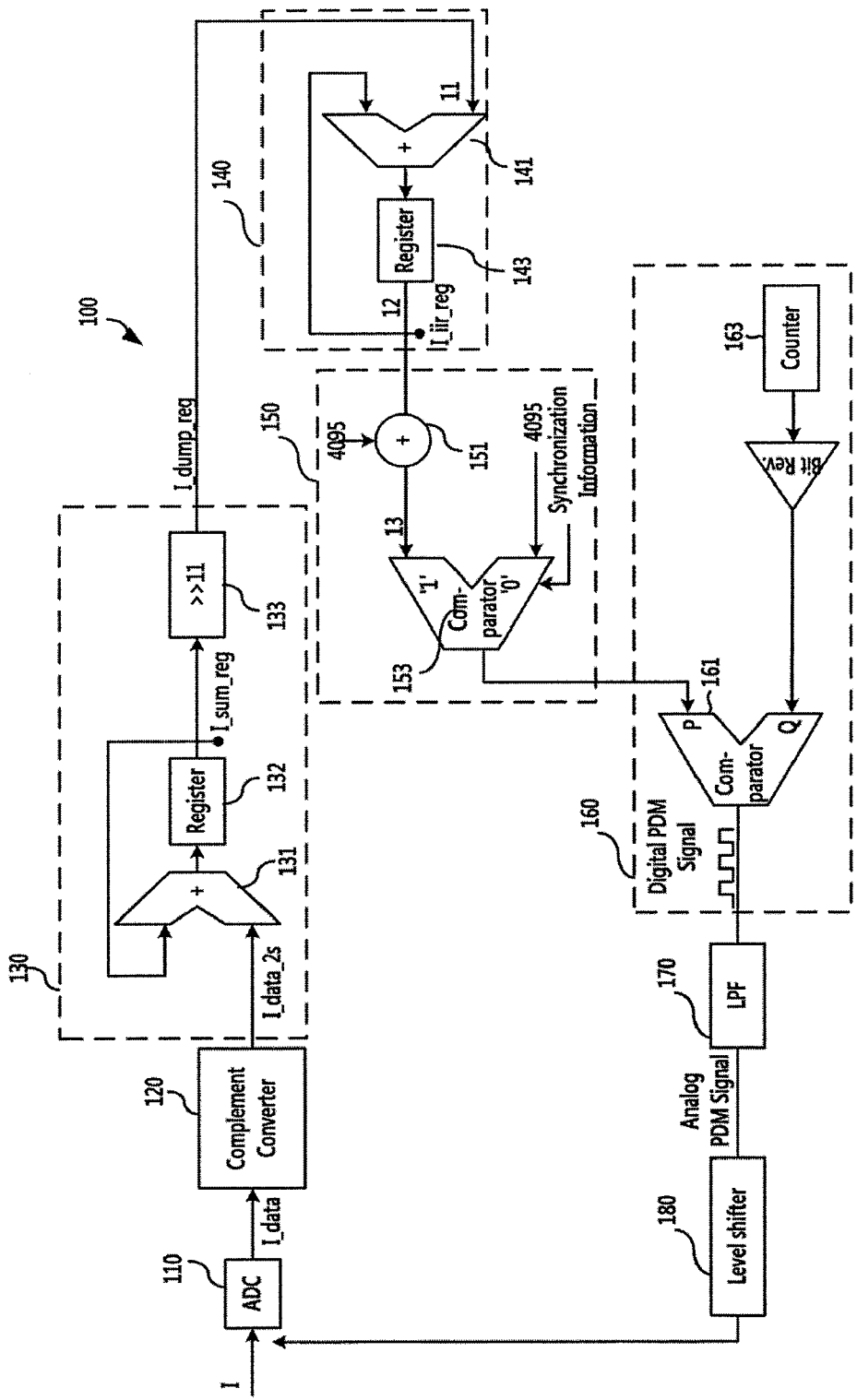
FIG. 2 is a diagram showing an apparatus for canceling a DC offset used for a receiver of an OFDM scheme according to an exemplary embodiment of the present invention.

FIG. 2 is a diagram showing an apparatus for canceling a DC offset according to an exemplary embodiment of the present invention.

As shown in FIG. 2, an apparatus for canceling a DC offset 100 includes an analog digital converter (ADC) 110, a complement converter 120, an adding/averaging unit 130, an accumulator 140, a synchronization determiner 150, a pulse density modulation (hereinafter, called PDM) signal generator 160, a low pass filter (hereinafter, called LPF) 170 and a level shifter 180.

The ADC 110 receives a frame data I of FIG. 1 and coverts it into a digital signal I_data. The digital signal I_data is input in binary bits into the complement converter 120.

The complement converter 120 converts the digital signal I_data inputted in binary into 12-bit complement data I_data_2s of 2. Such a conversion is desired to facilitate an addition of the input data.

The adding/averaging unit 130 includes an adder 131, a register 132, and a truncation unit 133. When the 12-bit complement data I_data_2s are input into the adder 131, the adder 131 adds the 12-bit complement data I_data_2s to a previous summation data I_sum_reg for the respective 1024 byte-preamble. The register 132 stores a new summation data I_sum_reg output from the adder 131.

When the summation data I_sum_reg are input into the truncation unit 133, the truncation unit 133 provides an average over the summation data I_sum_reg of the register 132. The average is utilized to determine a DC offset of the input signal. In order to determine a DC offset, the truncation unit 133 uses a truncation bit number capable of minimizing bit error rate of the OFDM system. The truncation bit number is given as 11 bit form through many simulations in this embodiment. Alternatively, other bits may be used as the truncation-bit number. In the other words, the truncation unit 133 cuts 12 or more bits from the summation data I_sum_reg and outputs 11-bit dump data I_dump_reg.

The accumulator 140 includes an adder 141 and a register 143. When the 11-bit dump data I_dump_reg is input into the accumulator 140, the adder 141 adds the 11-bit dump data I_dump_reg to a previous DC offset control value to output the current DC offset control value I_iir_reg. The DC offset control value I_iir_reg of the input signal is stored in 12 bit form at the register 143.

The synchronization determiner 150 includes an adder 151 and a comparator 153. Based on the synchronization information, the synchronization determiner 150 determines whether the current DC offset control value I_iir_reg is calculated by the block sample of the preamble data which the synchronization pulse has been hopping. When the current DC offset control value I_iir_reg is provided by the block sample data of the preamble, for example the block sample (B1) data, the synchronization determiner 150 outputs the current DC offset control value I_iir_reg to the PDM generator 160. When the current DC offset control value I_iir_reg is provided by, for example the block sample (B2), etc., rather than the block sample (B1), the synchronization determiner 150 outputs 0 to the PDM generator In detail, when the 12?bit DC offset control value I_iir_reg is input into the adder 151, the adder 151 adds the 12 bit DC offset control value I_iir_reg to the maximum value 4095 of 12 bit values thereby generating a 13-bit DC offset control value. When the 13-bit DC offset control value and the maximum value 4095 are respectively input into the comparator 153, the comparator 153 compares these two values with the synchronization information and outputs one of these two values. The comparator 153 has one input terminal "1" for receiving the 13-bit DC offset control value and another input terminal "0" for receiving the maximum value 4095.

Accordingly, when synchronization information is input into the comparator 153, the comparator 153 outputs one of the input data of one terminal ("1") and the input data of the other terminal ("0") based on the synchronization information. For example, when the synchronization is acquired and the synchronization information "1" is input into the comparator 153, the comparator 153 outputs the input data of one terminal "1", that is, the 13-bit DC offset control value. When the synchronization is not acquired and the synchronization information "0" is input into the comparator 153, the comparator 153 outputs the input data of the other terminal "0", that is, the maximum value 4095.

After all, when the synchronization is acquired, the 13-bit DC offset control value, which is calculated by operation of the adding and averaging unit 130 and the accumulator 140, is output into the PDM generator 160. When the synchronization is not acquired, the maximum value 4095, which means that a control value of the DC offset control value is "0", is output into the PDM generator 160.

The PDM generator 160 includes a comparator 161 and a counter 163. The counter 163 is a 13-bit counter with a non-sequential bit order. That is, an output value of the 13-bit counter 163 is input into one input terminal Q of a comparator 161. Also, the output value of the comparator 153 is input into the other terminal P of the comparator 161 to be converted into a single bit. The comparator 161 orderly compares the output values of the counter 163 to be input into the input terminal Q with the output values of the comparator 153 to be input into the other terminal P. When the output value of the comparator 153 is not less than the output value of the counter 163, the comparator 161 outputs "1", and when the output value of the comparator 153 is less than the output value of the counter 163, the comparator 161 outputs "0". In this manner, digital PDM signals are output.

The low pass filter (LPF, 170) separates and filters out higher frequencies than the specified frequency from the digital PDM signals, leaving only the specified frequency signal. The specified frequency signal is output as an analogue PDP signal.

The level shifter 180 shifts the analogue PDM signal so as to have a predetermined level. That is, when the level-shifted analogue PDM signal of the current input signal I is combined with the following input signal, a DC offset can be removed from the following input signal.

Next, an operation of the apparatus for canceling a DC offset according to an exemplary embodiment of the present invention is described with reference to FIG. 3.

Figure 3:
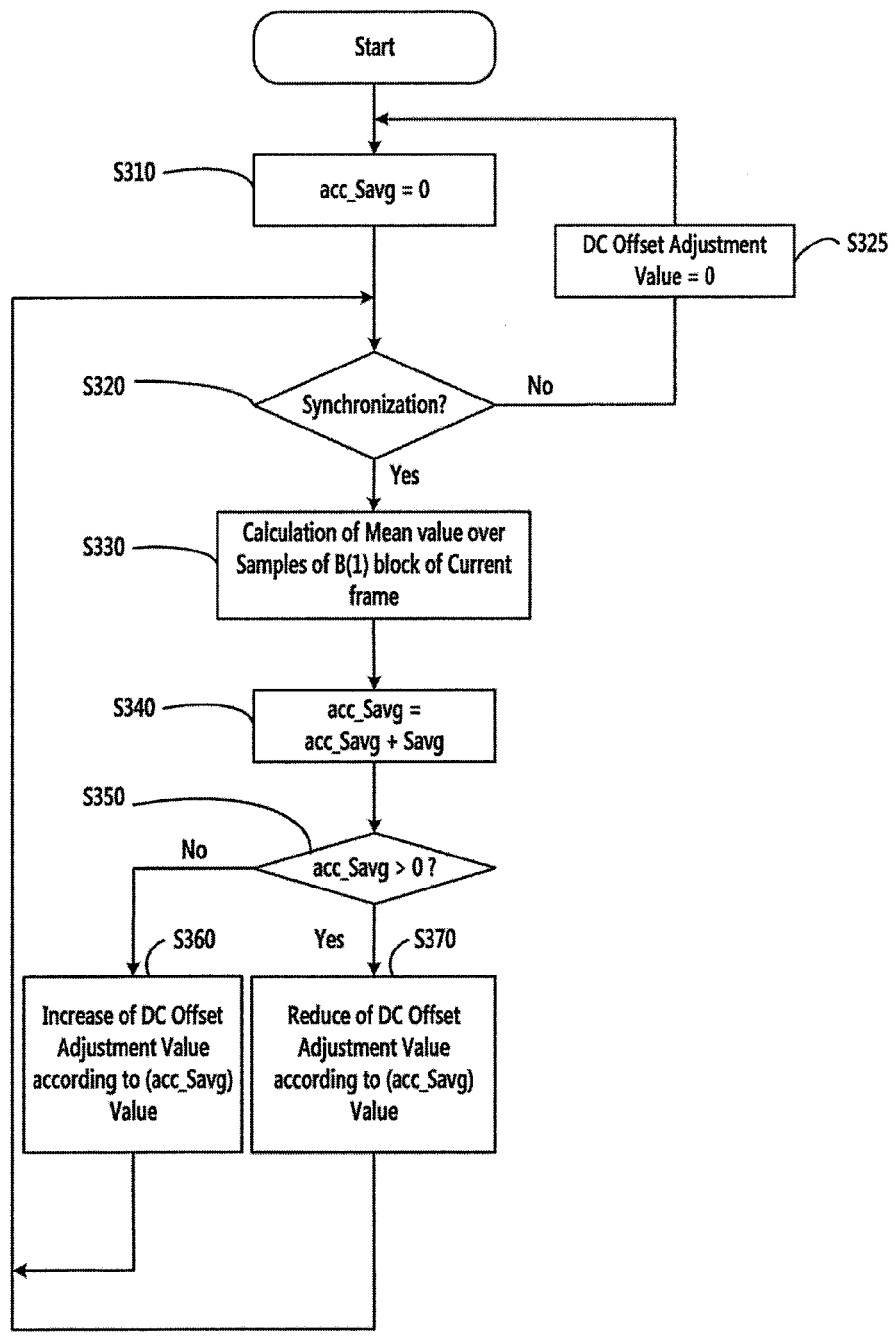
FIG. 3 is a flowchart for canceling a DC offset according to an exemplary embodiment of the present invention.

FIG. 3 is a flowchart for canceling a DC offset according to an exemplary embodiment of the present invention.

As shown in FIG. 3, when the apparatus for canceling a DC offset is turned on, an operation for canceling a DC offset is started and the adder 141 of the accumulator 140 is initialized. Accordingly, the output value acc_Save of the adder 141 is given as 0 (S310).

And then it is determined whether to acquire synchronization (S320). When the synchronization is not acquired, the DC offset control value becomes 0 (S325). As above noted, the comparator 153 outputs a value 4095, which does not include a DC offset since the preamble cannot be determined for the current frame data.

When the synchronization is acquired, an average value (Savg) is calculated over the samples of the preamble data B (1) block among the current frame data (see FIG. 1) by the adding/averaging unit 130 (S330).

Continuously, the average value (Savg) is added to an accumulation value (acc_Save) by the adder 141 so that a new accumulation value (acc_Save) is generated (S340).

It is determined whether the new accumulation value (acc_Save) is more than 0 (S350).

When the new accumulation value (acc_Save) is determined to be less than 0, the DC offset control value is increased according to the new accumulation value (acc_Save) by the PDM generator 160, the low pass filter 170, and the level shifter 180 (S360).

Meanwhile, when the new accumulation value (acc_Save) is determined to be more than 0 the DC offset control value is reduced according to the new accumulation value (acc_Save) by the PDM generator 160, the low pass filter 170, and the level shifter 180 (S370).

As above noted, when the synchronization is obtained, the preamble can be used to detect and remove the DC offset. Thus, the DC offset can be safely and accurately removed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an apparatus for canceling a DC offset of a receiver of a terminal used for an OFDM scheme, when the synchronization is obtained, the preamble can be used to detect and remove the DC offset. Thus, DC offset can be safely and accurately removed.

The invention claimed is:

1. An apparatus for canceling a DC offset of a terminal receiver used for an orthogonal frequency division multiplexing system, comprising:
    an adding and averaging unit for calculating a DC offset of an input signal by adding the input data signals and averaging the added input data signals over one frame;
    an accumulator for calculating a DC offset control value by successively accumulating the DC offsets calculated from the adding and averaging unit;
    a synchronization determiner for determining whether to output the DC offset control value provided by the accumulator based on a synchronization information, wherein the synchronization determiner determines to output the DC offset control value when the DC offset control value is a value calculated based on a predetermined block of the input signal only when synchronization is acquired, and the synchronization determiner sets the DC offset control value to a value corresponding to "0" when the DC offset control value is a value calculated when the synchronization is not acquired; and
    a pulse density modulation signal generator for generating a digital pulse density modulation signal based on the DC offset control value provided by the synchronization determiner.

2. The apparatus for canceling a DC offset of claim 1, wherein the adding and averaging unit includes:
    an adder for adding block sample data of the input signal;
    a register for storing output values provided by the adder; and
    a truncation unit for providing the DC offset using a truncation bit to minimize a bit error rate by truncating the summation data stored at the register.

3. The apparatus for canceling a DC offset of claim 1, wherein the synchronization determiner includes:
    an adder for adding a predetermined reference value to the DC offset control value output; and
    a comparator for outputting either of the reference value and an output value of the adder based on the synchronization information when the reference value and the output value are input.

4. The apparatus for canceling a DC offset of claim 1, further comprising:
    an analog digital converter for converting the input signal into a digital signal and providing the digital signal to the adding and averaging unit; and
    a complement converter for providing 2' complements of the digital data.

5. The apparatus for canceling a DC offset of claim 1 or claim 4, further comprising:
    a filter for generating an analogue pulse density modulation signal by filtering the digital pulse density modulation signal; and
    a level shifter for shifting the analogue pulse density modulation signal so as to have a predetermined level and transmitting the shifted analogue pulse density modulation signal to a following input signal.

6. A method for canceling a DC offset in a terminal receiver of an orthogonal frequency division multiplexing system, the method comprising:
    determining whether synchronization is acquired;
    calculating a DC offset control value for an input signal based on a sample data value of a predetermined block of the input signal only when the synchronization is acquired;
    outputting the DC offset control value corresponding to "0" before the synchronization is acquired;

outputting a pulse density modulation signal based on the DC offset control value; and shifting the pulse density modulation signal so as to have a predetermined level and transmitting the shifted analogue pulse density modulation signal to a following input signal.

7. The method for canceling a DC offset of claim 6, wherein the DC offset control value is obtained by using a truncation bit to minimize a bit error rate of the orthogonal frequency division multiplexing system.

8. The method for canceling a DC offset of claim 6, further comprising filtering the pulse density modulation signal after outputting the pulse density modulation signal.

9. The method for canceling a DC offset of claim 6, wherein the predetermined block is a preamble block applied directly after the synchronization is acquired.

10. The method for canceling a DC offset of claim 6, further comprising before generating the DC offset control value:

calculating an average value over the sample data value of the predetermined block;

generating an accumulation value by accumulating the average value; and determining a new DC offset control value based on the accumulation value.

11. The apparatus for canceling a DC offset of claim 1, wherein the predetermined block is a preamble block applied directly after the synchronization is acquired.

* * * * *